April 1, 1958   S. W. McELHENNY ET AL   2,829,332
ELECTRIC CONTROL SIGNAL DERIVING SYSTEM
Filed Dec. 23, 1955
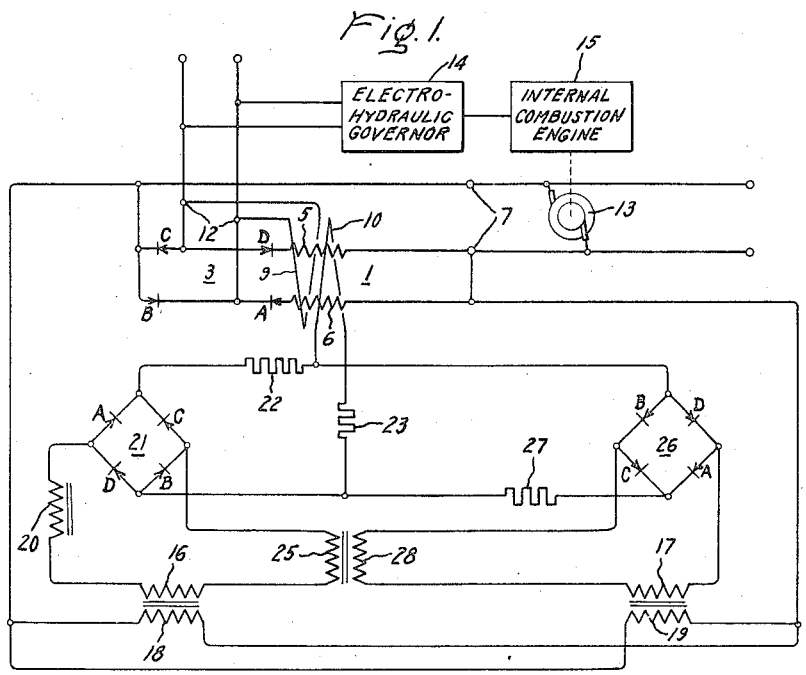
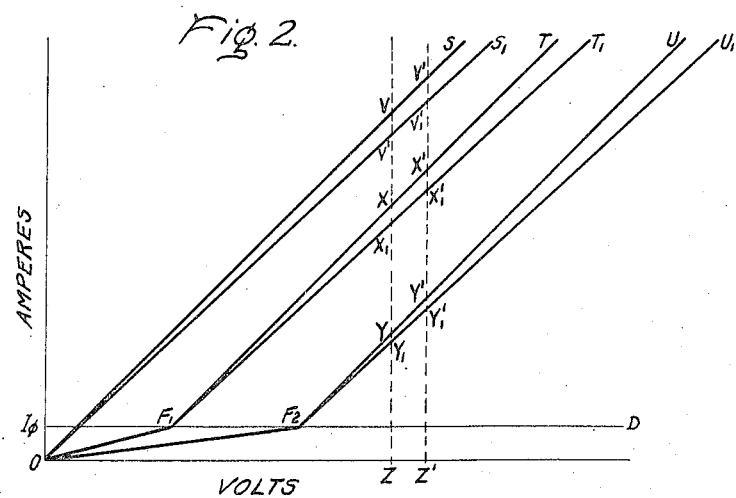
Inventors:
Stuart W. McElhenny,
William B. Zelina,
by   David R. Ogden
    Their Attorneys.

United States Patent Office 2,829,332
Patented Apr. 1, 1958

2,829,332

ELECTRIC CONTROL SIGNAL DERIVING SYSTEM

Stuart W. McElhenny and William B. Zelina, Erie, Pa., assignors to General Electric Company, a corporation of New York Application December 23, 1955, Serial No. 555,004

3 Claims. (Cl. 321—27)

Our invention relates to electric control signal deriving systems and more particularly to systems for deriving an electric current control signal which is responsive to variation in the frequency of a measured alternating current signal. Such frequency responsive signals are especially useful in the control of magnetic amplifiers.

In power control applications it is frequently necessary to derive an electric voltage or current signal that is directly proportional to the frequency of the voltage or current signal output of a dynamoelectric machine being controlled. In order to sense or control a base frequency, it is desirable that this voltage or current control signal be insensitive to harmonic oscillations in the alternating current which can be particularly troublesome because the harmonics often vary independent of the base frequency. Such a condition often occurs when controlling the speed of an alternator furnishing power to a load which has a variable power factor.

Therefore, an object of our invention is a simple and inexpensive system for deriving a control signal which is responsive to frequency changes and insensitive to harmonic variations in the alternating current signal being measured.

Briefly, in accordance with our invention in one form, we apply an alternating current through two similar sensing devices to a loop circuit through bridge rectifiers so that the rectified alternating currents may only flow in one direction around the loop circuit. Across this loop circuit we connect means to sense any differential in the currents supplied by the two devices. A saturable reactor, having an unsaturated impedance proportional to the frequency of the applied signal current, is connected between one of the devices and the loop circuit to cause a measurable frequency responsive differential. In order to eliminate any harmonics effect, we have connected a mutual reactive coupling between the two sensing devices.

Further objects and advantages of this invention will become apparent and this invention will be better understood from the following description with reference to the accompanying drawings. The features of novelty which characterize this invention will be pointed out with particularity in the claims annexed to and forming part of the specification.

Fig. 1 is a schematic showing one embodiment of our invention as applied to a voltage regulator; and Fig. 2 is a curve showing the volt-ampere characteristics of the transformer signals shown in Fig. 1.

Referring to Fig. 1, a conventional magnetic amplifier 1 consists of two saturable core reactors magnetically connected to operate as a high gain self-saturating magnetic amplifier. The cores are constructed of laminated punchings of grain oriented steel, allowing the magnetic amplifier 1 to have a "square" loop hysteresis characteristic. The amplifier is self-saturated by the currents rectified by the bridge rectifier 3 which flow through the winding 5 and 6 from an alternating current supply 7.

The bridge rectifier 3 prevents the flow of any unsaturating or negative ampere turns in the windings 5 and 6, and the impedance presented by the saturated amplifier 1 is negligible. A more complete explanation of a self-saturating magnetic amplifier is given in the co-pending application Serial No. 468,211, filed by William B. Zelina November 12, 1954, and assigned to the assignee of this application.

In order to control the saturation level of the amplifier 1, direct current windings 9 and 10 are magnetically connected thereto. When the control current or signal supplied to a current control winding 9 builds up until it more than counteracts the reference ampere turns of a reference winding 10, the saturation level is reduced, resulting in the first portion of each half-cycle of the rectified alternating current in the windings 5 and 6 being utilized to saturate the amplifier 1. Thus, before the core of the magnetic amplifier becomes saturated the alternating current will tend to carry the flux of the amplifier 1 through a portion of the saturation curve presenting considerable impedance to the rectified current in the windings 5 and 6. When the ampere turns of the control winding 9 are increased further, the period of high impedance during each half-cycle is also increased. With the windings 5 and 6 connected to energize the terminals 12 and the control winding 9 connected to be energized therefrom, it is possible to control the working voltage output across the terminals 12 by simply controlling the direct current of the reference winding 10 relative to the direct current of the control winding 9.

Fig. 1 also shows the control circuit of our invention for deriving a direct current signal responsive to the frequency of the alternating current which signal is not affected by any harmonics in the alternating current. This signal is particularly but not exclusively adapted to be used with a magnetic amplifier as shown. Another application of this signal using a relay and a carbon pile resistor is illustrated in the Letters Patent 2,588,319 issued March 4, 1952, to A. Fisher, and assigned to the assignee of this application.

The reference winding 10 receives an excitation current from the circuit shown which is designed to make this current frequency responsive and insensitive to voltage or harmonics. The number of ampere-turns of windings 9 and 10 are adjusted so that a small percentage change in the control ampere-turns (winding 9) will effect a net ampere-turn signal of considerable magnitude. Hence, it is apparent that the control ampere-turns of the control winding 9 and the load voltage across terminals 12 will follow within a small percentage error the reference ampere-turns or voltage of winding 10.

We have shown alternating current applied to the terminals 7 from an alternator 13, the speed of which is to be maintained by an internal combustion engine 15 controlled by an electro-hydraulic governor 14. The governor 14 is connected to receive a speed signal from the terminals 12. For the reference voltage source, we have connected two identical sensing means, shown as similar transformer secondary windings 16 and 17 provided with the same or identical primary windings 18 and 19, to produce similar signals proportional to the magnitude of the voltage of the alternating current signal component from the alternator 13 applied across terminals 7. Of course, in some applications other isolated sensing means could be used to provide these signals.

During one-half cycle, the current from the transformer winding 16 passes through a saturable reactor 20, through rectifier A of a bridge rectifier 21, and then through a resistor 22 through the reference winding 10, through a resistor 23, through a rectifier B of the bridge rectifier 21 and through a linear reactor winding 25 to the winding 16. During the other half-cycle of the current, the flow is through the winding 25, a rectifier C, through the circuit including the resistor 22, the reference winding 10, the resistor 23, through a rectifier D and the reactor 20.

Similarly, one-half cycle of the current from the transformer winding 17 passes through a rectifier A of a bridge rectifier 26, the resistor 27, the resistor 23, the reference winding 10, and then back through a rectifier B, through a linear reactor winding 28 to the winding 17. During the other half-cycle, the current flow is the same using rectifiers C and D of the bridge rectifier 26.

It is important that the currents from the two transformer windings 16 and 17 flow in the opposite direction through the reference winding 10 so that only the differential signal current will appear in the winding. Actually, this results in the current from the winding 16 flowing through the winding 17, with the differential current flowing from the winding 17 through the winding 10. In another form of this invention it might be preferable to separate the current from the windings 16 and 17 by using two electrically isolated bucking reference windings with each winding connected to an alternating current signal source such as a transformer winding and a bridge rectifier. The use of two windings has the disadvantage of requiring more space on the control leg of the magnetic amplifiers than the single reference winding 10.

As shown in Fig. 1, the rectified currents flowing from both transformer windings 16 and 17 in the loop circuit made up of the bridge rectifiers 21 and 26 and resistors 22 and 27 is clockwise. When resistors 22 and 27 present equal impedance to the current flow, any differential current signal in the reference winding 10 will be caused by the added impedance of reactor 20.

In order to fully understand this differential signal, we refer to the volt-ampere curve of Fig. 2 where the abscissa is the alternating current volt scale and the ordinate is the alternating current ampere scale. The line OS represents the volt-ampere characteristic of the resistance circuit described in connection with the transformer winding 17. If the saturable reactor 20 and the winding 25 were of no effect, the characteristic of the circuit of transformer winding 16 would also be controlled by the resistance of the circuit which, since it is the same as for the circuit of the winding 17, will produce a similar straight line volt-ampere characteristic OS. Even with no harmonics the volt-ampere characteristic of the circuit of the transformer winding 16 is not a straight line because of the unsaturated reactive impedance of the reactor 20, which impedance increases as the frequency of the alternating current signal component increases removing a portion of the alternating current from the circuit during the period when reactor 20 is unsaturated and causing the volt-ampere characteristic to follow a line such as $OF_1$ or $OF_2$ depending on the frequency.

The reactor 20 becomes saturated by the current $I\phi$ represented by the horizontal line $I\phi D$. At the low frequency $F_1$, $I\phi$ is reached at a relatively low voltage after which the reactive impedance of the reactor 20 does not appreciably affect the current flow of the basic frequency and the signal will follow a line $F_1T$ parallel to OS. Thus, the volt-ampere characteristic of the circuit of transformer winding 16 at frequency $F_1$ is shown as the curve $OF_1T$. When the frequency increases to $F_2$ the voltage required to produce the saturating current $I\phi$ is increased and the volt-ampere characteristic of the circuit of the transformer winding 16 is shown by the curve $OF_2U$.

Assume some signal voltage OZ which is a pure sine wave having no harmonics and which has enough voltage to saturate reactor 20 for the basic frequencies contemplated, is produced across the identical transformer windings 16 and 17. As shown in Fig. 2, the current flow through the transformer winding 17 is equal to VXYZ. At a frequency $F_1$ the current flow through transformer winding 16 is equal to XYZ. At a frequency $F_2$ this current would be equal to YZ.

It is apparent that the current VXYZ flowing through the transformer winding 17 does not equal the current XYZ flowing throug the transformer winding 16. This differential signal or current VX (at frequency $F_1$) passes through the reference winding 10 and its series resistor 23. At frequency $F_2$ the differential current is equal to VXY.

If we increase the voltage applied at the terminals 7 from OZ to OZ', it is readily apparent that the current V'X' equals VX and that the current V'Y' equals VY. The vertical distance between the parallel lines OS, $F_1T$ and $F_2U$ is still directly proportional to a frequency of the alternating current signal component applied to the similar transformer windings 16 and 17 as long as there are no harmonics, the resistors 22 and 27 are nearly equal and the saturable reactor 20 is chosen to be of a size that is saturated by the alternating current in the transformer winding 18.

Thus, we have developed a simple and inexpensive means for producing an appreciable direct current signal, on the order of half an ampere, that is directly proportional to the frequency of the applied alternating signal component. The use of this signal current in the reference winding 10 of a voltage regulator, which uses a very high gain magnetic amplifier 1 to maintain the percentage error difference between the current in the control winding 9 and reference winding 10 very small, yields an output across the control winding 9 which is of considerable power capacity and which is proportional to the base frequency of the output of the alternator 13.

Up to this point we have discussed Fig. 2 without discussing the effect of harmonics or our means for eliminating this effect. In actual practice, there are often harmonics of variable intensity depending upon the characteristics of the load on the alternator 13 and the impedance characteristics of the circuit shown in Fig. 1. Since a saturated reactor acts like an air core coil, it still impedes alternating current, particularly in the higher frequencies. Therefore, these harmonics will be partially blocked by the after-saturation impedance of the reactor 20 even in the region of the current $F_1T$ and $F_2U$. Thus, when harmonics are present the characteristics are changed to $OF_1T_1$ and $OF_2U_1$. This phenomena results in the change of slope of the lines $F_1T_1$ and $F_2U_1$ with respect to the line OS so that the lines are no longer parallel and the current differential is increased from VX to $VX_1$ at frequency $F_1$ and from VY to $VY_1$ at $F_2$ with the lower voltage Z. As the voltage is increased to Z' the error is increased. Under these conditions, $V'X_1'$ is greater than either VX, $VX_1$, or V'X' and $V'Y_1'$ is greater than VY, $VY_1$ or V'Y'. Since this error is caused by the after-saturation inductance of the reactor 20 simply increasing the resistive elements to correct the slope of the line OS will not correct the error of each of the variable harmonics.

In our invention we prefer to add an inductance to the circuit of the winding 17 to equalize the slope variation depending on impedance to harmonics. However, it is important that the effect of this added inductance does not merely aggravate the problem. Therefore, the windings 25 and 28 provide a linear reactance to absorb the same harmonics from each of the windings 16 and 17. These windings are connected respectively in the circuit with each of the windings 16 and 17 and magnetically connected on a common magnetic core resulting in a mutual linear reactor 25—28. The common magnetic path for the flux produced by these two windings 25 and 28, insures that the same harmonic signal voltage will be absorbed from each signal.

In order to provide the proper volt-ampere characteristic, we prefer that these linear reactors should have a reactance of at least ten times the after-saturation reactance of the reactor 20, and that the flux produced by the winding 25 should be additive with respect to the flux produced by the winding 28. The harmonics which would be absorbed by the reactor 20 are absorbed by the reactance of the windings 25—28 from the circuit of the winding 17. When a particular harmonic is not absorbed by the reactor 20, both windings 25 and 28 carry this harmonic, and, as the windings are additive and on a mutual magnetic core, the harmonic will have an effect of the same magnitude on the signals from each of the windings 16 and 17.

Thus, we have inserted the windings 25 and 28 to insure the slope of the line $OS_1$ equalling the slope of the lines $F_1T_1$ and $F_2U_1$ regardless of the magnitude of any harmonics in the alternating current signal.

In summary, the transformer 16—18 and the bridge rectifier 21 produce a direct current signal which is connected by the bridge rectifier 21 to the loop circuit having the resistors 22 and 27 serially placed therein to dissipate the major portion of the voltage from the rectified alternating current signal. A second rectified signal produced by the transformer 17—19 and bridge rectifier 26 is connected by the bridge rectifier 26 into this loop circuit so that the two signals may be compared. The differential signal, produced by the reactive impedance of reactor 20 is shunted through the reference winding 10. Because of the connection of the mutual reactive windings 25 and 28 between the signal circuits, harmonics superimposed on the base frequency will not affect the parallel relation between lines $OS_1$, $F_1T_1$ and $F_2U_1$. With the slope of the line $OS_1$ corrected by the windings 25 and 28 the current $V'X'$ is equal to $V_1'X_1'$ despite the presence of harmonics. Similarly the current $V_1Y_1$ is equal to $V_1'Y_1'$. The connection of the control winding 9 across the output of the high gain magnetic amplifier 1, causes the winding 9 to follow the reference winding 10 closely, giving a source of a frequency responsive signal regardless of any harmonics in the signal. This signal may be used to control the position of the electro-hydraulic governor 14 which controls the speed of the internal combustion engine 15 driving the alternator 13 to thus provide a constant speed drive for the alternator. Of course, this signal could be used to control the speed of any variable speed driving means without departing from the spirit of our invention.

While we have shown and described the particular embodiment of this invention, further modifications and improvements will occur to those skilled in the art. We desire it to be understood, therefore, that this invention is not limited to the form shown, and we intend in the appended claims to cover all modifications which do not depart from the spirit and scope of this invention.

What we claim as new and desire to secure by Letters Patent of the United States is:

1. Means for deriving an electric current proportional to a frequency of an alternating current signal comprising first means arranged to be electrically connected to the signal for providing a first current proportional to the magnitude of the signal, a similar second means arranged to be electrically connected to the signal for providing a second current proportional to the magntiude of the signal, saturable reactor means connected in circuit with said first means for limiting said first current in response to the frequency of the signal, means for subtracting said first current from said second current whereby a current proportional to the frequency of the signal is derived, a first reactive means connected in circuit with said first means and a second reactive means connected in circuit with said second means, said first and said second reactive means having a reactance substantially less than said reactor when unsaturated and greater than said reactor when saturated, said first and said second reactive means being inductively connected to each other whereby any harmonics in the signal will be absorbed thereby an equal amount in said first and said second means.

2. A system for deriving a direct current proportional to the base frequency of an alternating current component comprising a first means electrically connected to the component for deriving a first alternating current signal proportional to the magnitude of the voltage of the component, a similar second means electrically connected to the component for providing a second alternating current signal proportional to the magnitude of the voltage of the component, a closed loop circuit provided with two similar bridge rectifiers for connecting said first and said second means thereto to allow current flow through said loop circuit in one direction so that said first current flows through each of said bridge rectifiers, a saturable reactive impedance connected in circuit with said first means for absorbing a portion of said first current proportional to the frequency of the component, a reference winding connected across said loop circuit for carrying current from said second means greater than said first current whereby a current proportional to the frequency of the component is derived, a first reactive means connected in circuit with said first means and a second reactive means connected in circuit with said second means, said first and said second reactive means having a reactance substantially less than said reactor when unsaturated and greater than said reactor when saturated, said first and said second reactive means being connected magnetically by a common core whereby any harmonics in the signal will be absorbed thereby an equal amount in said first and said second means.

3. An electric circuit for deriving a signal directly proportional to the base frequency of an alternating current signal comprising two similar sensing means electrically connected to the alternating current signal for providing two substantially identical alternating currents having the same frequency as and proportional to the magnitude of the alternating signal, a saturable reactive impedance connected in circuit with one of said sensing means for absorbing a portion of the current from said sensing means in proportion to the frequency thereof, connection means serially connecting said sensing means for subtracting said reduced current from the other current thereby to derive a signal current proportional to the frequency of the alternating current signal, a first reactive means connected in circuit with said one sensing means and a second reactive means connected in circuit with the other of said sensing means, said first and said second reactive means having a reactance substantially less than said reactor when unsaturated and greater than said reactor when saturated, said first and said second reactive means being connected magnetically by a common core whereby any harmonics in the signal will be absorbed thereby an equal amount in said first and said second means.

References Cited in the file of this patent

UNITED STATES PATENTS

| | | |
|---|---|---|
| 2,448,442 | Kirschbaum | Aug. 31, 1948 |
| 2,459,640 | Griscom et al. | Jan. 18, 1949 |
| 2,666,885 | Bradley et al. | Jan. 19, 1954 |
| 2,725,518 | Sueker | Nov. 29, 1955 |